United States Patent Office 2,804,371
Patented Aug. 27, 1957

2,804,371

RECOVERY OF POTASH VALUES FROM BRINES

William B. Dancy and Albert Adams, Carlsbad, N. Mex., assignors to International Minerals & Chemical Corporation, a corporation of New York No Drawing. Application April 26, 1955, Serial No. 504,099

9 Claims. (Cl. 23—38)

This application concerns the recovery of potash values from brines, and more particularly, the recovery of potassium chloride from a brine containing essentially potassium and sodium chlorides and sulfate compounds.

The usual method for recovering solid phase potassium chloride from a potassium chloride-sodium chloride brine is to heat and evaporate the brine to the point where it is saturated with potassium chloride at the elevated temperature. Solid phase sodium chloride which precipitates from the evaporated solution is removed, for example by filtration. The mother liquor remaining following the removal of the sodium chloride is then cooled and potassium chloride crystallized from the solution and separated, for example by filtration. This procedure is a very effective method for recovering potassium chloride from potassium chloride-sodium chloride brines if the brine is substantially free of sulfate ions. When the latter ions are present, the potassium chloride produced will be contaminated with substantial quantities of sulfate salts, such as langbeinite or glaserite. On the other hand, if steps are taken to modify this process to obtain a potassium chloride substantially free from precipitated sulfate ions, for example by crystallizing the sulfate salts out of solution with the sodium chloride, substantial quantities of potash values will be lost and the recovery of potash values will be reduced.

It is an object of this invention to provide a process for recovering potash values in high yields and high purity from brines containing essentially potassium and sodium chlorides and soluble sulfate salts.

It is another object of this invention to provide a process for recovering potash values from the aforesaid brines by a process which is simple and commercially feasible.

In accordance with this invention, a brine containing essentially potassium chloride, sodium chloride, and sulfate ions, and less than about 3.5%, by weight, of magnesium ions, is treated with gypsum at a temperature below about 80° C. to form syngenite. The solid phase syngenite is separated from the reaction mixture and the remaining mother liquor containing sodium chloride and potassium chloride is evaporated until it is saturated with respect to potassium chloride. Sodium chloride precipitates from the heated liquor during the evaporation process and is removed, for example by filtration. The evaporated liquor from which sodium chloride has been removed is then cooled to crystallize potassium chloride therefrom. The potassium chloride crystals can be separated, for example by filtration. Potassium chloride recovered in this manner is substantialy entirely free of sulfate contamination.

According to a specific embodiment of this invention, a brine containing essentially potassium chloride, sodium chloride, and sulfate ions and having a typical composition as shown in Table 1 is treated with gypsum, preferably in an amount of about one mole of gypsum per mole of sulfate ions in the solution. If less than substantially complete removal of sulfate ions is acceptable, less than this amount of gypsum may be utilized. The use of more than this quantity of gypsum merely introduces an excess of calcium and sulfate ions into solution. Brines which may be treated successfully in this invention may contain up to about 5% sulfate salts, by weight, of the solution. Preferably, brines treated in accordance with this invention will contain less than about 3% magnesium ions, by weight.

TABLE 1

| Percent K | Percent Mg | Percent Na | Percent Cl | Percent SO$_4$ | Percent H$_2$O |
|---|---|---|---|---|---|
| 5.44 | .77 | 7.38 | 16.26 | 3.11 | 67.05 |

The reaction mixture is agitated at a temperature below about 80° C., and preferably, below about 30° C. or at room temperature, until the reaction of the gypsum with the sulfate ions in the brine is substantially complete. At temperatures above about 80° C. anhydrite will form in place of syngenite. Usually the reacton requires at least about one-half hour. It is not necessary that gypsum be added as such, for calcium chloride, preferably in an amount of about one-half mole of calcium chloride per mole of sulfate ions in solution may be substituted therefore. The addition of calcium chloride results in the in situ formation of gypsum and the reaction to form syngenite will proceed as if gypsum had been added. Syngenite is removed from the reaction mixture, for example by filtration, and is suitable for use as a low grade potassium sulfate. The mother liquor remaining, following removal of solid phase syngenite, is evaporated until it is substantially saturated with respect to potassium chloride. During the evaporation, sodium chloride separates from the liquor and is removed, for example by filtration. The evaporated mother liquor saturated with respect to potassium chloride and from which the sodium chloride has been removed is then cooled to crystallize potassium chloride therefrom. The potassium chloride, which may be removed from the cooled liquor by filtration, is substantially entirely free from sulfate contamination.

A desirable starting material for carrying out this invention is langbeinite ore containing potassium chloride and sodium chloride as impurities or sylvinite ore containing sulfate salts as impurities. Either of these ores and similar ores may be treated with water to produce a solution saturated with respect to potassium chloride and sodium chloride and containing sulfate ions. Such a solution is a "brine" as that term is used in the specification and claims.

The following examples illustrate specific embodiments of this invention. All parts are by weight unless otherwise indicated.

Example I

About 2000 parts of a typical potash industry brine having an analysis as shown in Table 2 was evaporated down to about 1400 parts. Sodium chloride which was precipitated during the evaporation was filtered from the mother liquor at about 90° C. The mother liquor, which had a composition as shown in Table 2, was then cooled from about 90° C. to about 30° C. to crystallize potassium chloride therefrom. The potassium chloride was filtered off and dried. The composition of the mother liquor remaining at 30° C. following the separation of the potassium chloride crystals is indicated in Table 2.

TABLE 2

| Liquor | Percent K | Percent Mg | Percent Na | Percent Cl | Percent SO4 | Percent H2O |
|---|---|---|---|---|---|---|
| Brine | 5.44 | 0.77 | 7.38 | 16.26 | 3.11 | 67.05 |
| Mother liquor at 90° C | 8.33 | 1.24 | 6.45 | 18.04 | 4.18 | 61.76 |
| Mother liquor at 30° C | 5.60 | 1.48 | 6.54 | 15.84 | 4.91 | 65.63 |

The potassium chloride recovered by this procedure had a K₂O value of about 47.19 and was contaminated with co-precipitated sulfates.

Example II

A typical potash industry brine having the same percentage composition as shown in Example I in the amount of 4000 parts was agitated at room temperature with 111.4 parts of gypsum. After 2 hours the solid phase syngenite produced was separated from the reaction mixture by filtration and was suitable for use as a low grade potassium sulfate. The mother liquor from which the syngenite was removed had the analysis shown in Table 3.

TABLE 3

| Percent K | Percent Mg | Percent Na | Percent Cl | Percent SO4 | Percent H2O |
|---|---|---|---|---|---|
| 4.17 | 0.82 | 7.55 | 16.92 | 1.22 | 69.32 |

2000 parts of the mother liquor was heated and evaporated down to about 1214 parts and sodium chloride which precipitated during the evaporation was filtered off after cooling to about 90° C. The mother liquor remaining following removal of solid phase sodium chloride had the following analysis:

TABLE 4

| Percent K | Percent Mg | Percent Na | Percent Cl | Percent SO4 | Percent H2O |
|---|---|---|---|---|---|
| 8.08 | 1.69 | 5.35 | 18.80 | 2.30 | 63.78 |

The filtrate was then cooled from about 90° C. to about 30° C. with resulting crystallization of potassium chloride from the solution. The solid phase potassium chloride was separated from the liquid phase by filtration and dried. The remaining mother liquor had the analysis shown in Table 5.

TABLE 5

| Percent K | Percent Mg | Percent Na | Percent Cl | Percent SO4 | Percent H2O |
|---|---|---|---|---|---|
| 4.56 | 1.83 | 5.73 | 16.48 | 2.48 | 68.92 |

The potassium chloride crystals recovered had a K₂O analysis of about 60.5%.

Having now fully described and illustrated the character of the instant invention, what is desired to be secured by Letters Patent is:

1. The process for recovering potash values from a brine containing essentially potassium chloride, sodium chloride and sulfate ions, and less than about 3.5% magnesium ions, by weight, which comprises treating said brine at a temperature below about 80° C. and above the freezing point thereof with a calcium salt selected from the group consisting of calcium sulfate and calcium chloride, whereby syngenite ($K_2SO_4 \cdot CaSO_4 \cdot H_2O$) forms as a solid phase, separating said syngenite from the reaction mixture, evaporating the mother liquor until sodium chloride is substantially precipitated, separating the precipitated sodium chloride, cooling the evaporated mother liquor to crystallize potassium chloride therefrom, and removing the solid phase potassium chloride from the cooled liquor.

2. The process for recovering potash values from a brine containing essentially potassium chloride, sodium chloride and sulfate ions, and less than about 3.5% magnesium ions, by weight, which comprises treating said brine with gypsum at a temperature below about 80° C. and above the freezing point thereof, whereby syngenite forms as a solid phase, separating said syngenite from the reaction mixture, evaporating the remaining mother liquor until it is substantially saturated with respect to potassium chloride, whereby sodium chloride precipitates therefrom, separating the precipitated sodium chloride from the hot liquor, cooling the evaporated mother liquor and separating solid phase potassium chloride from the cooled liquor.

3. The process of claim 2 in which the gypsum is added in an amount of about one mole per mole of sulfate salts in the brine.

4. The process of claim 3 in which the brine to which the gypsum has been added is agitated for at least one-half hour before separating syngenite from the liquid phase.

5. The process of claim 3 in which the gypsum is added in an amount of about one-half mole per mole of sulfate salts in the brine.

6. The process for recovering potash values from a brine saturated with potassium chloride and sodium chloride and containing up to about 5% sulfate salts, by weight, and less than about 3.5% magnesium ions, by weight, which comprises treating the brine with gypsum at a temperature below about 80° C. and above the freezing point thereof, whereby syngenite forms as a solid phase, separating said syngenite from the reaction mixture, evaporating the remaining mother liquor until it is substantially saturated with respect to potassium chloride, whereby sodium chloride precipitates therefrom, separating precipitated sodium chloride from the hot evaporated liquor, cooling the hot liquor to about 90° C., and separating additional sodium chloride from the evaporated liquor, further cooling the sodium chloride-free to crystallize potassium chloride therefrom, and separating and recovering potassium chloride from the cooled liquor.

7. The process of claim 6 in which gypsum is added in an amount of about one mole per mole of sulfate salts in the brine.

8. The process of claim 7 in which the brine containing the added gypsum is agitated at a temperature below about 30° C. for a period of time of at least one-half hour prior to removal of syngenite.

9. The process of claim 8 in which the gypsum is added in an amount of about one-half mole of calcium chloride per mole of sulfate salts in solution.

References Cited in the file of this patent

UNITED STATES PATENTS

| 1,394,978 | Dolbear | Oct. 25, 1921 |
| 1,422,571 | Harlow | July 11, 1922 |

FOREIGN PATENTS

| 437,652 | Great Britain | Nov. 5, 1935 |

UNITED STATES PATENT OFFICE

CERTIFICATE OF CORRECTION

Patent No. 2,804,371                                                  August 27, 1957

William B. Dancy et al.

It is hereby certified that error appears in the printed specification of the above numbered patent requiring correction and that the said Letters Patent should read as corrected below.

Column 4, line 48, claim 6, after the words "chloride-free" insert -- liquor --; line 59, claim 9, strike out "of calcium chloride".

Signed and sealed this 5th day of November 1957.

(SEAL)

Attest:
KARL H. AXLINE
Attesting Officer

ROBERT C. WATSON
Commissioner of Patents